United States Patent [19]

Cutter et al.

[11] 4,145,375

[45] Mar. 20, 1979

[54] MAKING STYRENE/MALEIC ANHYDRIDE COPOLYMERS BY SUSPENSION POLYMERIZATION

[75] Inventors: Louis A. Cutter, Pittsburgh, Pa.; Robert E. Nunn, Marion, Ohio

[73] Assignee: United States Steel Corporation, Pittsburgh, Pa.

[21] Appl. No.: 881,347

[22] Filed: Feb. 27, 1978

[51] Int. Cl.$^2$ ............................................. C08L 25/04
[52] U.S. Cl. ................................. 260/874; 260/875; 260/886; 526/272
[58] Field of Search .................... 260/874, 875, 886

[56] References Cited

U.S. PATENT DOCUMENTS

| | | | |
|---|---|---|---|
| 2,971,939 | 2/1961 | Baer | 260/45.5 |
| 3,336,267 | 8/1967 | Zimmerman et al. | 526/208 |
| 3,401,153 | 9/1968 | Zimmerman et al. | 526/87 |
| 3,492,254 | 1/1970 | Strand et al. | 260/874 X |
| 3,509,110 | 4/1970 | Di Giulio et al. | 526/11.1 |
| 3,551,523 | 12/1970 | Killoran | 260/880 |
| 3,574,790 | 4/1971 | Young et al. | 260/874 |
| 3,919,354 | 11/1975 | Moore et al. | 260/880 R |

*Primary Examiner*—Thomas DeBenedictis, Sr.
*Attorney, Agent, or Firm*—William L. Krayer

[57] ABSTRACT

Styrene is copolymerized with maleic anhydride by mixing maleic anhydride with styrene under mass polymerization conditions in a ratio of styrene to maleic anhydride of at least 5:1, continuing to add maleic anhydride throughout a mass polymerization stage until about 25% to about 40% of the styrene monomer is reacted to produce a reaction mass in which the polymerized maleic anhydride is about 1% to about 10% of the total reaction mass. The polymerization is then completed in a pH-adjusted free-radical initiated suspension stage, which generates homopolymer of styrene. During the suspension stage about 10% to about 20% of the bound maleic anhydride is hydrolyzed. The acid component of the bound maleic acid may be converted back to the anhydride through the use of a vented extruder.

3 Claims, No Drawings

MAKING STYRENE/MALEIC ANHYDRIDE COPOLYMERS BY SUSPENSION POLYMERIZATION

BACKGROUND OF THE INVENTION

Prior to the present invention, it has been known to make copolymers of styrene and maleic anhydride in a bulk process, which requires the handling of highly viscous materials. See, for example, Baer U.S. Pat. No. 2,971,939. However, the Baer product does not have entirely desirable thermal properties, i.e., it tends to become slightly fluid at high temperatures. Although Baer discloses that the thermal properties of styrene-maleic anhydride are dependent on the method of preparation, and that products with the best thermal properties are made by slow addition of maleic anhydride to excess styrene and then removing excess styrene to recover styrene-maleic anhydride, the thermal properties are still less than satisfactory. His material is a random styrene-maleic anhydride copolymer. If the excess styrene is polymerized rather than removed, the resulting product is reported to be a mixture of styrene-maleic anhydride with homopolystyrene. Polymerization of excess styrene at the termination of the normal polymerization cycle yields the styrene homopolymer because the highly reactive maleic anhydride is by then consumed. The product is extremely difficult to handle and to cool.

The Baer process and other similar methods of the prior art for copolymerizing styrene and maleic anhydride in nonequimolar composition are bulk or solution processes, which require the handling of highly viscous polymer solutions, with attendant difficulties in heat transfer for the removal of the heat of reaction and in materials handling. It is known to polymerize styrene and some of its copolymers in aqueous suspension, in large measure circumventing the heat transfer problem, and greatly simplifying materials handling. On the other hand, it is very difficult to polymerize styrene directly with maleic anhydride in aqueous suspension, because of the rapid hydrolysis of maleic anhydride to maleic acid, a strongly ionized acid.

SUMMARY OF THE INVENTION

We have developed a process for copolymerizing styrene and maleic anhydride which involves a sequence of operations in which maleic anhydride is first gradually admixed with styrene in a mass stage under polymerizing conditions to rapidly form styrene-maleic anhydride polymer. The styrene-rich mixture is then suspended in water and the styrene polymerization completed as in a conventional mass/suspension polymerization system. The suspension step can further modify the polymer by opening the anhydride group to form free carboxylic acid groups on the polymer chain.

In a preferred method of the bulk phase of the process, maleic anhydride or a solution of maleic anhydride in styrene is added slowly to a reactor containing an initial charge of styrene, and optionally a free-radical initiator. Chain transfer agents can be added to control the molecular weight of the product polymer. Maleic anhydride addition should begin at a point no later than that at which about 3% of the styrene is polymerized. The admixing of styrene and maleic anhydride should be in a ratio of at least 5:1, continuously or intermittently throughout the mass polymerization stage until the polymerized maleic anhydride content is, at about 25% to about 40% monomer conversion, about 1% to about 10% of the total reaction mass. Slow addition of the maleic anhydride, i.e. a rate no greater than the rate at which styrene polymerizes alone under the reactor conditions, is important, since the insoluble 50 mole percent copolymer may be formed in the presence of somewhat smaller concentrations of maleic anhydride. Water should be absent, since its presence leads to the rapid hydrolysis of maleic anhydride to form maleic acid; its presence in turn makes the subsequent suspension step more difficult. Reaction temperature is advantageously in the range 100°–120° C. for the thermal reaction. In the presence of initiators, lower temperatures may be employed, i.e., as low as 75° C. In any case, the temperature should be high enough so that a significant amount of styrene homopolymerization can occur (2–5%/hour), without being so high that the polymerization reaction occurs at a rate that is difficult to control (greater than 15% per hour). If the temperature is too low for significant homopolymerization to occur, or the feed rate of maleic anhydride is too high, the concentration of maleic anhydride can build up during slow feeding to a point where the 50 mole percent copolymer is formed and precipitates, rather than more soluble compositions richer in styrene and containing less maleic anhydride.

It is advantageous to feed styrene monomer with the maleic anhydride since the heat absorbed in heating the styrene-maleic anhydride mixture to the polymerization temperature reduces the amount to be removed by external cooling.

After the addition of the maleic anhydride and before the viscosity of the polymerization mixture becomes excessive (20,000 centipoises), the suspension phase of the reaction is started with the addition of water and suspending agents in the conventional manner. This point is usually about 25% to about 40% conversion. Generally a volume of water about equal to the reaction mixture is preferred, but water may typically comprise somewhat less than 50% or up to about 60% or more of the suspension. While virtually all the maleic anhydride will normally have been reacted at 25% to 40% conversion, it should be noted that it is desirable not to suspend unless there is less than about 1% unreacted maleic anhydride present.

Polyvinyl alcohol (88% hydrolyzed) is the preferred suspending agent with the surfactant sodium dodecylbenzene sulfonate present as an auxiliary agent. Suspension stability may be enhanced by adjustment of the pH into the range of 4.5–7.0. Inorganic, acid-soluble suspending agents should not be used, since the colloidal form will not be achieved in the pH range we employ; starch, gelatin, PVP, polyethers, polyalcohols, hydroxyethyl cellulose, and other conventional suspending agents are usable in varying degrees of desirability. A free-radical initiator (for example, t-butyl perbenzoate) is added and the polymerization mixture is heated with agitation through a typical rising-temperature polymerization cycle, e.g., four hours at 111° C. followed by a 3-hour heating period at 132° C. Following the heating period, the polymerization mixture is cooled; the polymer beads are separated from the water by a solid-bowl centrifuge and dried in a rotary air drier. The beads leaving the drier are dry on the surface but may contain several percent of internal moisture which can subsequently diffuse to the surface.

For this reason, a residence time at 60°–100° C. of several hours may be employed to reduce the moisture and facilitate subsequent processing. After drying, the beads are likely to contain some internal moisture, and in addition approximately 15 percent of the bound maleic anhydride may be present in the acid rather than the anhydride form. Upon heating, during extrusion to form pellets the acid portion reverts to the anhydride with the elimination of a mole of water for each mole of anhydride formed. For these reasons a well-vented extruder (preferably with a vacuum vent) is needed to produce a bubble-free extrudate.

EXAMPLE I

Maleic anhydride (29 lbs.) was dissolved in 233 lb. styrene at 30° C. in the presence of 9.75 grams tertiary butyl catechol. A 100-gallon reactor was charged with 100 lb. styrene and heated to 111° C. The maleic anhydride solution was fed to the reactor at the following intended rates: 0.67 lb/min for 80 minutes, then at 1.0 lb/min for 70 minutes and finally at 1.3 lb/min until the solution was all added for a total intended addition time of about 256 minutes. The actual rates were slightly slower and the addition took 279 minutes. During this addition period, the reaction mixture remained clear. The batch temperature was maintained at 111° C. for a total of 375 minutes. After the addition was completed, the mixture became cloudy. At that point the solution was about 30 percent polymer and had a viscosity at 130° F. of 3160 centipoises. Twenty-eight gallons of deionized water were then added, then a solution at 60° C. containing 12 gallons of deionized water, 110 grams of polyvinyl alcohol and 50 grams of sodium dodecylbenzone sulfonate. This mixture was followed by 7.8 gallons of water. The batch was suspended as droplets in water. The pH was adjusted into the range 4.5–6.0 with 300 grams of NaOH. A free-radical initiator, tertiary butyl perbenzoate, was added in the amount of 130 grams. The reactor was sealed and reheated to 111° C. for 4 hours and then to 132° C. for 3 hours. Following the heating, the beads were cooled, centrifuged and dried. The product beads had an oven volatile level of 2.46 percent. Residual styrene was 0.09 percent. Bead size distribution was as follows:

| Sieve No. | Wt, % |
|---|---|
| 20 | 2.4 |
| 40 | 62.7 |
| 60 | 27.1 |
| 80 | 5.6 |
| 100 | 1.4 |
| Pan | 0.8 |

The beads were extruded at a melt temperature of 380° F. on a 1-inch vented extruder with a vacuum of 25 inches of mercury. Pellets with the following properties were produced:

| Melt Index (I) | 5.52 |
|---|---|
| Tensile Strength at Break | 6325 psi |
| Flexural Strength | 10500 psi |
| Izod Impact | 0.22 ft-lb/in |
| Vicat Softening Point | 239° F. |

EXAMPLE II

Styrene (10,000 pounds) was initially added to a reactor and heated to 111° C. A solution of styrene (23,000 pounds) and maleic anhydride (2,900 pounds with 975 grams of t-butyl catechol) was fed slowly and continuously to the reactor for 3.75 hours from a dissolving tank. After the addition period, the viscosity was allowed to reach 1,000 centipoises (conversion about 30%) before suspending in 4,725 gallons of water with 28.2 lb. of polyvinyl alcohol and 5,000 grams sodium dodecylbenzene sulfonate (Nacconol 90 F) as suspending agents. The pH was raised to 5.5 with NaOH and 29 lb. t-butyl perbenzoate initiator was added. The mixture was heated to 111° C. for four hours and then to 132° C. for three hours. The batch was cooled, transferred to a hold tank and centrifuged and dried. The dry beads were blown to a silo where further drying was continued by a flash dryer which recirculates beads from a silo heating them with hot air (93°–104° C.) on each pass. The beads were extruded on a vented extruder so that the moisture not removed in the drying operation was permitted to escape. In addition about 0.25 percent water was formed when the maleic acid present in the beads was converted to the anhydride on heating in the extruder. A sample of the beads was extruded in a one-inch laboratory extruder with vacuum venting and the properties of Table I were measured on the pellets obtained.

Temperatures were maintained at 111° C. for most of the reaction period in the mass stage, but became difficult to control and to monitor toward the end, tending to increase slightly.

EXAMPLE III

Styrene (10,000 pounds) was charged to the reactor as in Example II and heated to 111° C. A solution of 2050 lb. maleic anhydride in 16,200 lb. styrene with t-butyl-catechol prepared as in Example II was fed continuously to the reactor for 3.0 hours during which time the batch temperature rose from 111° C. to 126° C. and the viscosity reached 580 centipoises. At this point the batch was suspended and completed as in Example II with properties determined in the same way. These are listed under Example III in Table I.

EXAMPLE IV

Eleven batches were made in the following manner. Maleic anhydride (29 lb.) was dissolved in 162 lb. of styrene at 50° C. in the presence of 4 g of t-butyl catechol. Two additional grams of t-butyl catechol were added after dissolution of the maleic anhydride and before cooling to 30° C. The reactor, charged initially with 200 lb. of styrene, was heated to the mass stage temperature indicated in Table II and the maleic anhydride solution added at a rate of about 0.6 to 0.8 lb/min until all was added, a procedure requiring 200–276 minutes. After completion of the addition the batches were suspended as in Example I with the same finishing procedure.

In Batch 5, 32 g of benzoyl peroxide was added to the mass stage before heating to 100° C. In Batches 6 and 7, the 29 lb. maleic anhydride was added as solid briquettes to 333 lb. styrene at 100° C., 2.25 lb. every 15 minutes. The beads from all runs were blended and extruded under vacuum on a 3½-inch vented extruder. The properties of the pellets made by extrusion are listed in Table I as Example IV.

The properties listed in Table I under column A are for a conventional commercial copolymer of styrene and maleic anhydride. In column B are listed those for a commercial polystyrene.

Beads produced by Example II were then studied to determine the maleic acid and maleic anhydride contents. See Table III. A small sample of beads was extracted with benzene by shaking at room temperature for 48 hours. The benzene insolubles were filtered off, dried, weighed, and analyzed for acid and anhydride content. The benzene soluble portion as treated with methanol. The precipitated solid was collected by ultra-centrifugation. A dry sample of material was titrated for acid and anhydride content and examined by infrared spectroscopy. A sample of beads was vacuum-dried and pelletized on a 1-inch Killion extruder. Acid and anhydride contents of the pellets were determined.

The anhydride content of a commercially available random styrene-maleic anhydride was also determined.

The thermal properties of beads and pellets of the Example II styrene-maleic anhydride product were determined and compared with those of the conventional commercial product.

Fractionation with benzene obviously separated styrene homopolymer from a mixture of styrene/maleic acid/maleic anhydride terpolymer (see Table III). The acid groups arise from hydrolysis of anhydride groupings during the suspension stage of the process. The benzene extracted beads showed little change in appearance and extraction of the material in a more finely divided state would undoubtedly have removed more homopolystyrene. The disappearance of acid groups during pelletization of beads (Table III) indicates reformation of the anhydride grouping during the conversion of beads to pellets at a temperature of 350° F. In the conventional commercial product, only the anhydride grouping was detected.

The final pelletized product of our invention is thus a mixture containing about 70% homopolystyrene and about 30% styrene/maleic anhydride copolymer.

The differences between the Vicat softening point and DTUL of commercial material and material of the invention (shown in Table IV), are a reflection of the differences in structure. Baer, in U.S. Pat. No. 2,971,939, has previously noted the higher thermal properties of a random styrene/maleic anhydride copolymer (i.e., such as the one tested) and a mixture of homopolystyrene with a styrene/maleic anhydride copolymer.

Table I

| | Sytrene-Maleic Anhydride Copolymer | | | | |
|---|---|---|---|---|---|
| | Example II | Example III | Composite Trial Example IV | A | B |
| Physical Properties | | | | | |
| Tensile Strength | 7,020 | 7,000 | 7,000 | 8,045 | 7,500 |
| Modulus psi × 10⁵ | 5.09 | 5.06 | 4.23 | 3.88 | 4.5 |
| Elongation % | 1.64 | 1.51 | 1.8 | 3.26 | 3.5 |
| Flexural Strength, psi | | | 12,100 | 16,000 | 14,000 |
| Modulus psi × 10⁵ | | | 4.55 | 4.59 | 4.5 |
| Izod ft-lb./in. | | | 0.22 | 0.42 | 0.5 |
| Vicat ° F. | 238 | 236 | 238, 241 | 252, 247 | 222 |
| DTUL ° F. | 222 | 222 | 219, 220 | 243, 244 | 214 |
| Melt Index (I) g/10 min | 1.90 | 1.86 | 3.7 | 4.0, 3.9 | 3.4* |
| Appearance | Cloudy | Cloudy | Cloudy | Clear | Clear |
| Chemical Properties | | | | | |
| GPC MN | 98,000 | 102,400 | 103,500 | 126,500 | — |
| MW | 341,600 | 352,600 | 330,800 | 279,400 | 280,000 |
| Bound Maleic Anhydride % | 7.5 | 7.1 | 7.5 | 7.7 | None |
| Residual Styrene % | 0.04 | 0.022 | 0.029 | 0.130 | 0.140 |
| Volatiles % | 0.93 | 0.49 | 0.53 | 0.22 | — |

*Condition G

TABLE III

| Analysis of Styrene/Maleic Anhydride Products | | | |
|---|---|---|---|
| Sample | Maleic Acid | Maleic Anhydride | Total |
| 1. Initial Beads (Example II) | 3.2 | 5.2 | 8.4 |
| Benzene Insoluble Fraction of Initial Beads | 9.7 | 10.1 | 19.8 |
| Benzene Soluble Fraction of Initial Beads* | 0.0 | 0.0 | 0.0 |
| Initial Beads After Vacuum Drying | 1.3 | 6.2 | 7.5 |
| Pellets made from Vacuum Dried Beads | 0.0 | 7.5 | 7.5 |
| 2. Conventionally Mass Polymerized Commercial S/MA** | 0.0 | 7.7 | 7.7 |

*This fraction had an infrared spectrum of homopolystyrene.
**This polymer is completely soluble in benzene.

TABLE IV

| Thermal Properties of Various S/MA Samples | | | |
|---|---|---|---|
| Sample | Vicat, ° F. | DTUL, ° C. | Annealed Tg, ° C. |
| 1. Initial Beads | 245* | | 114, 162 |
| Vacuum-Dried Beads | 247* | | 103, 152 |
| Pellets From the Beads | 235** | 222 | 105, 150 |
| 2. Commercial Material | 247** | 243 | 119 |

*Determined on compression-molded plaque.
**Determined on injection-molded bar.

Table II

| Batch | 1 | 2 | 3 | 4 | 5 | 6* | 7* | 8 | 9 | 10 | 11 |
|---|---|---|---|---|---|---|---|---|---|---|---|
| Mass Stage Temp ° C. | 111 | 105 | 105 | 100 | 100 | 100 | 100 | 111 | 111 | 111 | 111 |
| Feed Time min | 225 | 276 | 240 | 213 | 210 | 219 | 268 | 222 | 220 | 210 | 200 |
| Mass Stage Time min | 250 | 296 | 270 | 270 | 225 | 240 | 275 | 320 | 250 | 240 | 280 |
| Suspension Viscosity Centipoises | 5600 | 3700 | 3700 | 2920 | 2240 | 2700 | 8600 | 2600 | 3220 | 2820 | 2600 |
| Residual Styrene % | .067 | .050 | .055 | .058 | .047 | .031 | .026 | .072 | .067 | .100 | .053 |
| Volatiles % | .57 | .54 | .51 | .63 | .62 | .68 | .70 | .57 | .59 | .54 | .43 |
| Tensile strength psi | 6600 | 6600 | 6625 | 6845 | 6930 | 6775 | 6395 | 5880 | 6345 | 6430 | 6530 |
| Modulus at 10⁵ psi | 3.99 | 4.23 | 4.06 | 4.20 | 4.35 | 4.21 | 4.66 | 4.14 | 4.12 | 4.29 | 4.33 |
| Elongation % | 1.71 | 1.63 | 1.72 | 1.72 | 1.74 | 1.71 | 1.47 | 1.31 | 1.60 | 1.58 | 1.62 |
| Vicat ° F. | 241 | 241 | 246 | 239 | 236 | 238 | 239 | 244 | 244 | 240 | 244 |
| Melt Index I g/10 min | 6.0 | 4.4 | 3.6 | 2.66 | 2.30 | 2.32 | 2.65 | 6.55 | 5.40 | 4.72 | 3.26 |
| Bound Maleic % | 7.21 | 7.54 | 8.23 | 7.67 | 7.30 | 7.82 | 7.96 | 7.95 | 8.05 | 7.70 | 7.89 |
| GPC Mn | 101800 | 113600 | 103000 | 108100 | 110500 | 92000 | 103100 | 75100 | 97100 | 90600 | 87300 |
| Mw | 317600 | 336500 | 346000 | 367400 | 420900 | 454500 | 466600 | 288200 | 302100 | 303600 | 306800 |

*Maleic anhydride added as solid briquettes.

Determination of transition temperatures was done on a DuPont differential scanning calorimeter. Vicat softening point and deflection temperature under load (DTUL) were determined by ASTM methods D1525-70 and D648-R, respectively.

The differences in the transition temperatures as measured by differential scanning calorimetry of the commercial material and the new material are also significant. See Table IV. The conventional commercial material shows one transition at 119° C. for a random copolymer containing 8% maleic anhydride. The plant-produced beads show transitions at 114° C. and 162° C. It is believed that elimination of water occurs at 162° C. and acid groups are converted to the anhydride grouping, because on again analyzing the identical sample, which had apparently lost some moisture, the 162° C. peak is greatly reduced and a curve similar to that obtained for pelletized product of Example II is obtained. This curve shows transitions at 105° and 150° C., which correspond to a peak for homopolystyrene and a styrene-maleic anhydride copolymer containing about 25% maleic anhydride.

Examples V and VI compare the effect of pH adjustment.

EXAMPLE V

Styrene 400 g was charged to a stirred glass pressure reactor and heated to 121° C. A solution of 68.5 g maleic anhydride in 270 g of styrene with 0.0165 g of t-butyl catechol was added over a period of 200 minutes. A slightly hazy solution was obtained with a viscosity at 150° F. of 3680 centipoises (at 180 minutes). The mixture was suspended at 200 minutes by the addition of the following mixture at 60° C.:

- 330 ml deionized water
- 8.8 ml of a 6% solution of Gelvatol 20-90 polyvinyl alcohol in water
- 0.212 g of sodium dodecylbenzene sulfonate (Nacconol 90 F.) and 430 ml deionized water at 60° C. added separately.

T-butyl perbenzoate initiator (0.64 g) was added and the mixture was heated to 111° C., where the suspension failed after 30 minutes at 111° C.

EXAMPLE VI

The experiment of Example I was repeated as follows: Styrene (400 g) was heated to 121° C. and a solution containing 320 g styrene, 80 g maleic anhydride and 0.02 g t-butyl catechol was added over a period of 171 minutes. The reaction mixture was hazy with a viscosity of 5000 centipoises at 150° F. The same suspension mixture was used as before but was adjusted in pH from 2.3 to pH 5.6 with 10 ml of 20 percent NaOH solution. After addition of 0.64 g t-butyl perbenzoate the mixture was heated to 111° C. and kept at that temperature for four hours. It was subsequently heated to 132° C. for three hours. The beads were dried in air for 48 hours at 75° C. A sample of beads was heated in a vacuum oven at 200° C. for 40 minutes at 25 inches of mercury. A melt index of 0.49 condition G was obtained with a Vicat softening point on a compression molded disk of >255° F.

The pH in the suspension stage should be adjusted to between about 4.5 and about 7.0.

We claim:

1. Method of making a mixture of polystyrene and a copolymer of styrene and maleic anhydride comprising (a) mixing together under mass polymerization conditions styrene and maleic anhydride in a ratio of at least 5:1 and at rates such that maleic anhydride is not added at a rate greater than the rate at which the styrene polymerizes under the current polymerization conditions, until about 25% to about 40% of the monomers are polymerized, to produce a reaction mass containing polymerized maleic anhydride in an amount comprising from about 1% to about 10% of the total reaction mass, (b) suspending the reaction mass in water, adjusting the pH of the suspension to between about 4.5 and about 7.0, and carrying the styrene polymerization reaction to completion with the aid of a free-radical initiator to form beads of polymer product.

2. Method of claim 1 including the step of separating the beads from the water.

3. Method of claim 1 followed by passing the beads through a vented extruder to convert acid groups to the anhydride form.

* * * * *